INVENTOR.
Charles S. Schaevitz
BY
ATTORNEY.

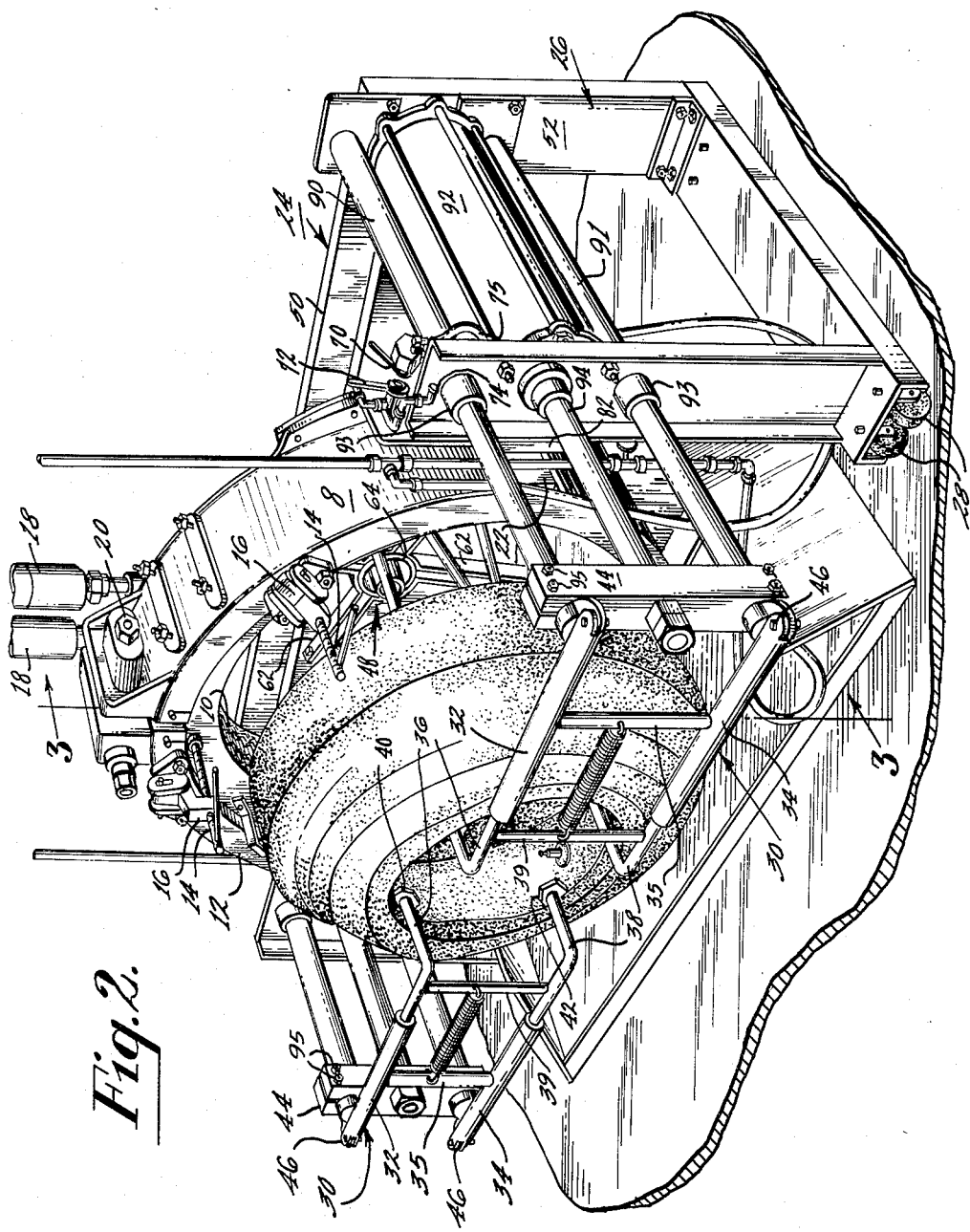

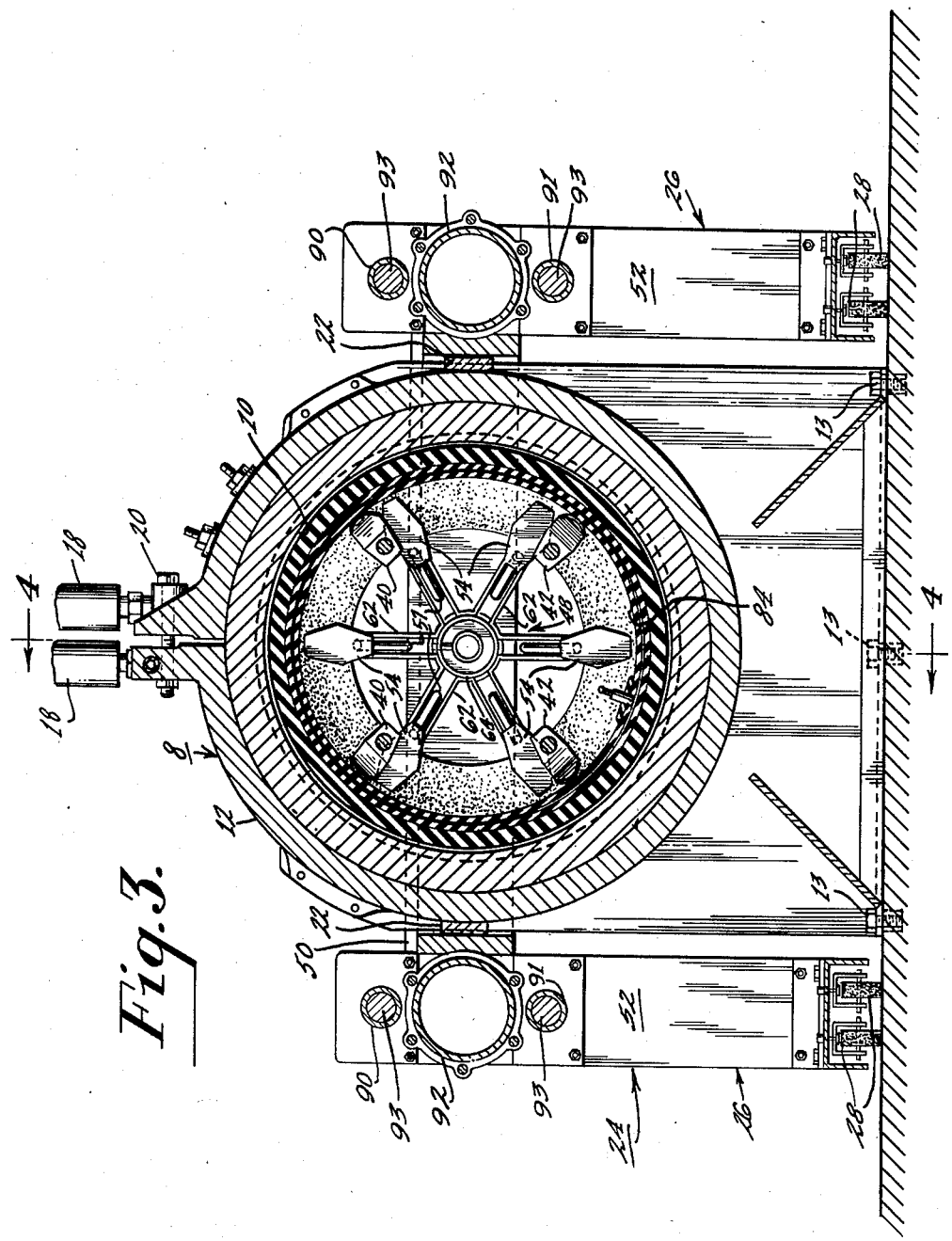

Feb. 10, 1959
C. S. SCHAEVITZ
2,872,704
RECAPPING MACHINE
Filed July 9, 1956
4 Sheets-Sheet 4
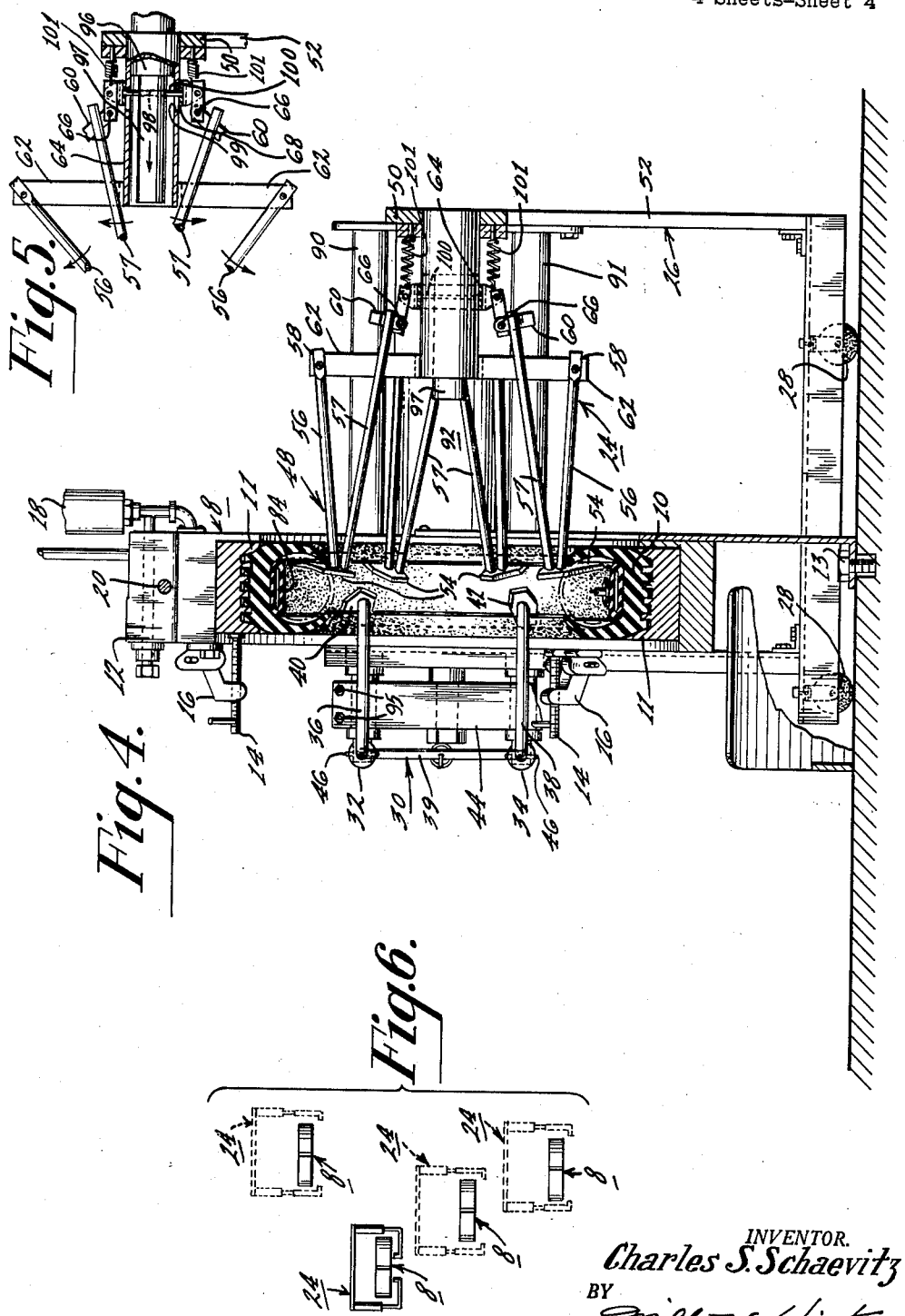
INVENTOR.
Charles S. Schaevitz
BY
Milton S. Winters
ATTORNEY.

United States Patent Office 2,872,704
Patented Feb. 10, 1959

2,872,704

RECAPPING MACHINE

Charles S. Schaevitz, Haddon Township, Camden County, N. J., assignor to Schaevitz Bros., Inc., a corporation of New Jersey Application July 9, 1956, Serial No. 596,468

3 Claims. (Cl. 18—18)

The present invention is related to recapping or retreading machines.

There are different kinds of recapping machines, that is machines for curing the material newly applied to a tire for recap. Some of these machines hold a mold into which a tire is to be inserted with the axis of the mold vertical. The tire is then lifted, spread to suitably reduce its diameter, and inserted. The tires are often awkward to handle in this position. Further, the tire must be centered in the mold vertically to bring the central plane of the tire and the mold into coincidence. For different sizes of tires, the tires should be dropped a different distance into the mold, requiring a support plate to center the tire, or depending on the skill of the operator to center the tire. In either event, centering the tire is difficult. When a support plate is used, the operator must be sure the tire rests evenly on the plate. Centering without a supporting plate is even more difficult. Failure to center may result in spoilage, or a recapped tire which does not wear adequately. Other machines have a mold with a horizontal axis. These machines have also presented problems in use. A horizontal axis machine requires that the tires be lifted and supported coaxially of the mold for insertion. The problem of centering the tire and the mold to bring their planes central to the respective tire and mold axes into coincidence is even more difficult of solution. In most cases, the operator forces and aligns the tire in the mold in accordance with his judgment. In addition to being strenuous work, this is time consuming, and the tire is often placed in the mold in misalignment.

It is among the objects of the present invention to provide an improved machine for curing the material applied to a tire for recap or retread.

A further object is to provide a machine of the kind described which affords quicker and easier insertion of a tire into a mold with accurate centering as contrasted to prior machines.

A further object of the invention is to provide a machine which automatically and accurately centers the tire in a recap or retread mold, with greater ease and accuracy than in prior machines.

A further object of the invention is to provide a machine for recapping a tire which accurately centers the tire in the mold with less hand labor than required in previous machines, and is substantially free of errors due to errors of judgment by an operator.

A further object of the invention is to provide a machine for the insertion and withdrawal of tires from a recap or retread mold which is improved over prior machines.

Another object of the invention is to provide a machine for the insertion and withdrawal of tires from a recap or retread mold which may be separated into two major units, one of which may serve with several of the other, thereby reducing the equivalent per unit investment as compared to other, prior machines for the like purpose.

According to the invention, I provide a machine with two, separable, major units, one a tire spreader unit, and the other a mold unit. These units are movable with respect to each other, for example, the mold unit may be fixed, and the tire unit on wheels, preferably arranged to allow free motion of the spreader unit in any direction on the floor. The mold unit preferably has its axis horizontally disposed, as does the tire spreader unit. The mold in the mold unit is provided with guide aprons.

When the tire is spread by the tire spreader, it is reduced in diameter sufficiently to be inserted into the mold under a guide apron. As the spreading forces applied to the tire are released, the forces resulting from the expansion of the tire into the mold cause the tire guided by the guide aprons and the tire spreader unit holding the tire to move relative to the mold unit in a manner to bring the forces into equilibrium and center the tire in the mold. That means with the mold, such as aprons, may be used for this purpose of guiding and centering the tire in the mold as the tire expands, has not been recognized heretofore, so far as I know, nor has the value of a tire guiding apron or the like in such a combination been recognized, although aprons may have been used incidentally to control the distribution of rubber during a recapping operation. Now the tire spreader unit may be removed and used with another mold unit, while the tire inserted in the first mold unit is cured. When the cure is complete, the same or a different spreader unit may be returned to the first mold unit to remove the tire and insert another. In this manner, one spreader unit may serve with several mold units.

The above-mentioned and other objects, advantages, and novel features of the invention will be more fully apparent from the following description when read in connection with the accompanying drawing, in which:

Figure 2 is a perspective view of the two units with a tire spread and ready for insertion into the mold of the mold unit;

Figure 3 is a cross-sectional view along the line 3—3 of Figure 2, but with the tire inserted and the spreader still holding the tire spread;

Figure 4 is a cross-sectional view along the line 4—4 of Figure 3, but with the spreader just released;

Figure 5 shows in greater detail a portion of the spreader unit; and

Figure 6 is a top view showing several mold units laid out for service with one spreader unit.

Figure 1:
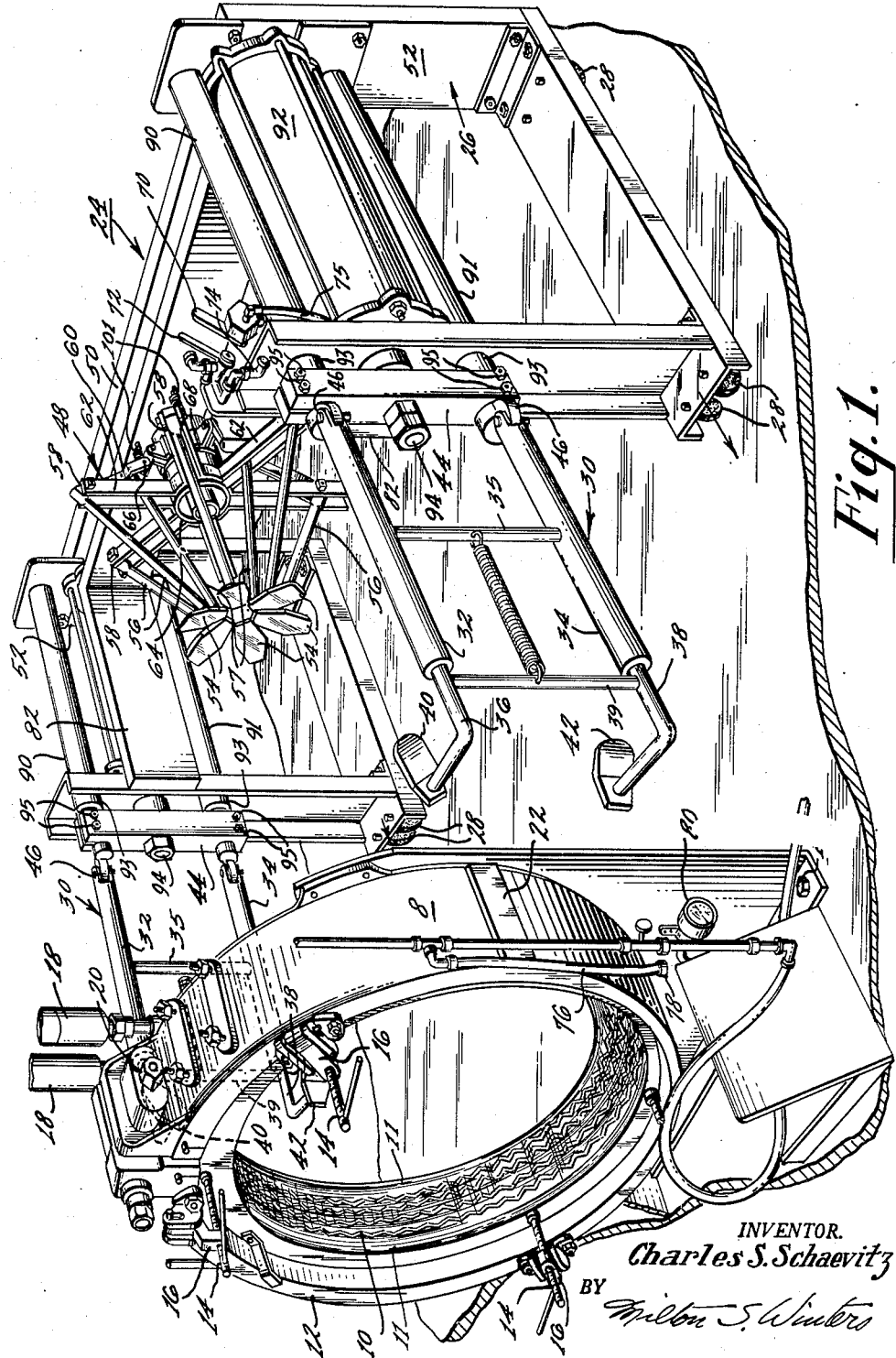
Figure 1 is a perspective view of one embodiment of the invention, showing a mold unit and a tire unit separated.

With reference to Figure 1, the mold unit 8 is arranged to hold a tire mold 10 with its axis horizontal. The mold 10 has inwardly extending guide aprons 11 symmetrically formed on each side of the mold. The minimum diameter of each of the aprons 11 is less than the diameter of the mold. Further, the inner face of each of these aprons 11 is inclined and curved away from each other with decreasing apron diameter and away from the plane in which the central mid-line of the mold lies, that is, from a plane normal to the axis of the mold. These inner, guiding faces of the aprons are spaced and inclined so that they are separated by a greater distance as the diameter decreases, and so that the spacing between the aprons is substantially equal to that of the width (measured along the mold axis) of the inner face of the mold, as these guiding faces reach the mold diameter. These aprons may be made separately, or as part of the mold as shown here.

A chamber 12 is provided into which the mold 10 may be locked by means such as the levered screws 14 threaded through angle bars 16 bolted to the chamber 12. At the top of the chamber, conduits 18 provide an entry and return for a steam or electric line to convey heat into chamber 12.

The spreader unit 24 has a framework 26 mounted on wheels 28. These wheels are arranged to turn freely in any direction, as by a ball bearing swivel type of arrangement. On the front of the framework 26 are mounted a pair of front claw assemblies 30. Each claw assembly 30 includes an upper arm 32 and a lower arm 34. Upper and lower extensions 36, 38, respectively, are telescoped into the upper and lower arms 32, 34. The extensions have near their ends remote from that telescoped into the arms, a bend of ninety degrees and terminate in front claws 40, 42, respectively. The arms 32, 34 are supported from laterally spaced, vertical posts 44 by hinges 46. The hinges 46 permit one of the pair of arms 32, 34 to be swung in towards the other pair of arms 32, 34, until the two pairs of arms are in substantial alignment, but no further. These hinges 46 also permit the arms 32, 34 to be swung open, to leave the front of the spreader unit 24 free to be advanced to embrace the mold unit 8, or to be completely withdrawn therefrom as desired. Each pair of upper and lower arms 32, 34 are coupled rigidly together by a cross-bar 35. Each pair of upper and lower extensions 36, 38 are coupled together by a cross-bar 39.

On each side of the framework 26 between front and rear corner posts, are two cylinders, an upper cylinder 90, a lower cylinder 91, and a third, central cylinder 92. Each of the upper and lower cylinders receives a closely fitting guide rod 93. The central cylinder 92 receives a drive rod 94 and a double acting pneumatic piston (not shown) to which the drive rod 94 is connected. On each side of the framework 26, at their ends which extend out of the cylinders 90, 91, and 92, the guide rods 92 and the drive rod 94 are connected to a post 44. Thus each post is supported above and below by the guide rods 93, and centrally by the drive rod 94. Note that the guide rods may support the posts 44 by an arrangement in which each rod has a flat, reduced dimension portion near its end which slides into slots at the corresponding end of the post 44 to which it is attached, and held there by nuts and bolts. Thus the slotted ends of the posts 44 each grasps a different one of the guide rods 93 at its end. The hinges 46 may, if desired, be attached respectively to the very ends of the guide rods 93 which extend through and in front of the posts 44. Each drive rod 94 is bolted to the center of the corresponding post 44.

The framework 26 also supports a rear claw assembly 48 on and centrally of a horizontal, rear cross-frame member 50 held by two vertical rear post members 52. The rear claw assembly 48 has six rear claws 54 connected respectively to the ends of six first claw rods 56 and also the ends of six, second claw rods 57. The other ends of the first claw rods 56 are held respectively in six angle joints 58. Also held in the respective angle joints are the ends of six lever rods 60. The angle joints 58 are pivoted respectively between six pairs of spider beams 62, near the outer ends of the beams. Each pair of beams 62 is parallel with the other beam of the same pair. These beams radiate outwardly from a centrally disposed cylinder member 64 on which the beams 62 are rigidly mounted, each pair displaced at about sixty degrees from the next pair, to form a spider assembly. Each of the second claw rods 57 passes between a different pair of the pairs of spider beams 62 and is held, at the end opposite to that attached to the claw 54, on a different one of six pins 66 each supported in the arms of a Y-like terminal of a different lever rod 60. The pins are mounted respectively in bearings located at substantially sixty degree intervals about and carried by a rear cylinder 68. The rear cylinder 68 is carried on the rear portion of the cylinder member 64 and embraces the cylinder member 64 to be guided coaxially by it. The cylinder member 64 (see now particularly Fig. 5) is fixed to the rear, cross-frame member fixedly, and has an internal bore which receives a single acting, pneumatic piston 96. This single acting piston 96 drives a rod 97. The rod 97 may simply be an extension of the piston, as shown. The piston rod 97 has a slot 98, and passes through a slotted portion 99 of the cylinder member 64. The rear cylinder 68 rides along axially forward or backward over the slotted portion 99. A drive bar 100 held diametrally in the rear cylinder 68 fits snugly in the piston rod slot 98. The drive bar also fits in the cylinder slotted portion 99 in a sliding fit permitting an appreciable amount of easy forward and backward sliding motion, but no transverse or rotational motion. Springs 101 are connected between the rear cylinder 68 and the rear cross-frame member 50 to hold the rear cylinder 68 normally retracted to the limit of its rearward motion.

Levers 70 and 72 are provided which control valves for admission of air under pressure. A separable coupling 74 is provided to which a compressed air hose may be coupled or decoupled readily. The compressed air is then conducted through tubings, such as 75, from the valves controlled by the lever 72 to the piston chambers of the double acting pistons (not shown) of the central cylinders 92, and from the valves controlled by the lever 70 to the single-acting piston 96. An air line 76 having a separable coupling 78 with a suitable pressure gauge 80 may be permanently mounted on the mold unit 8. Inwardly facing guide plates 82 on the framework 26 are provided for cooperating with the outwardly facing guide plates 22 on the mold unit 8.

In operation, when a tire is to be inserted in the mold unit 8, the spreader unit 24 is brought up to the tire unit. The arms 32, 34 of the front claw assembly are manually swung outwardly from each other so that they extend straight forward, each pair parallel to the other pair. The spreader unit is now moved forward until the outwardly facing guide plates 22 of the mold unit 8 are engaged by the inwardly facing guide plates 82 of the spreader unit. These guide plates are registered to assure that the two units, the mold unit 8 and the spreader unit 24, are laterally centered, substantially, when the units are brought together. At the same time, a certain freedom of movement should be allowable. Therefore, one of the pairs of guide plates may be planar. The other pair, for example, the outwardly facing guide plates 22, may be curved cylindrically about a vertical axis which passes substantially through the center of the tire mold. This curvature is in no way critical. The important point is to preserve a certain freedom of movement of the units with respect to each other.

A tire to be treated may now be brought before the machine. The rear claw assembly 48 has been brought forward until it extends through the tire mold far enough to reach a tire to be hung on these claws in front of the mold unit 8. Note that ordinarily the operator need not lift the tire for this purpose. The tire is maneuvered into an upright position in front of the machine with the upper part of the tire substantially over the rear claws 54. The rear claws 54 are clustered near the axis of the rear claw assembly by reason of the springs 101, which draw the rear cylinder 68 to the rear. Thus, the upper ones of the rear claws 54 are normally well below the top of the tire when it is thus positioned in front of the mold unit 8. The air hose couplings 78 of the mold unit 8 may now be coupled to the air hose coupling 74 of the spreader unit 24 to provide air under pressure, from the air supply line 76, through the couplings, to the valves controlled by the levers 70, 72. The second lever 70 is now operated to admit air to the single-acting piston 96, causing it to move forward. The drive bar 100 (Fig. 5) is also moved forward, carrying the rear cylinder 68 forward on the cylinder member 64 against the restoring force of the springs 101. This movement causes the rear claws 54 all to move outwardly from the axis of the rear claw assembly and away from each other radially. The connections of the first and second claw rods 56, 57 to the claws is rigid. When retracted, these claws tend to toe forward. However, when expanded in this arrangement, the claws tend to point their toes rearwardly, which tends to hold the tire more securely at its bead, or against its side-wall. As the claws move outwardly, the upper claws move in an upward direction. The tire is maneuvered, still resting on the floor, if further maneuvering is required, so that these upper rear claws catch in the annular well of the tire. As the rear claws 54 continue to move outwardly, the tire is lifted by these upper claws, and the other, remaining rear claws 54 also are engaged in the annular well of the tire.

At this point, when the rear claws 54 have all firmly engaged the tire, the front claws may now be swung toward the tire, thus closing the embrace of the spreader unit 26 around the mold unit 8 and the tire. The extensions 36, 38 are extended so that the front claws 40, 42 can enter the tire. If necessary, the lever 72 may now be turned in either direction required, admitting air to the one side of the double-acting cylinder and releasing air from the other, and moving the front claw assembly 30 on the posts 44 forward or back, so that the front claws 42, when the extensions 36, 38 are now returned into the arms 32, 34, engage in the annular well of the tire. Note that springs, as shown, may be included on the extensions to hold them normally retracted, and aid in engaging the front claws 40, 42 in the tire.

Then, when both the rear claws 54 and the front claws 40, 42 are well engaged, the first lever 72 is again operated in a direction to cause the entire front claw assembly, carried by the posts 44, to move forward, moving the front claws 40, 42, away from the rear claws 54. The front claws 40, 42 cannot yield further toward the rear than a certain point, because the front claw assembly hinges 46 have stops which do not permit further movement of the arms 32, 34 in the rear direction.

As a result of the operation thus far described, the tire to be inserted in the mold unit 8 is spread, as shown in Fig. 2, with the front claws 40, 42 engaged against one of the beads or sides of the tire, and the rear claws 54 engaged against the opposite beads, or opposite side walls of the tire. Now the tire has been appropriately selected for the size of the mold in the mold unit 8. Fresh retread material has been applied to this tire in preparation for its entry into the mold. The spreading of the tire, in the manner just described, by pulling apart the opposite side walls, reduces the tire diameter. The diameter of the tire is reduced sufficiently so that the entire spreader unit may now be moved by hand to bring the tire through the opening afforded by the front apron 11 roughly into position centrally of the mold 10. The insertion is easy because the height of the mold unit 8 is adjusted for the size of the tire mold so that the axis of the tire mold and the axis of the spreader unit 26 are at the same distance from the floor. The outwardly facing guide plates 22 cooperating with the inwardly facing guide plates 82 assures lateral centering of the units 8 and 24. Therefore, moving the tire into position centrally of the mold 10 is comparatively easy.

The next step is to release the spreading forces applied to the tire by the claws. The control lever 72 is now moved to cause a change in pressures in the double-acting cylinder to retract the drive rod 94, and allow the tire to expand radially. Preferably, the lever is moved so that the release is made rather slowly. As the spreading forces exerted on the tire walls or beads are released, the tire expands, and begins to fill the mold 10. However, before completing entry into the mold, the tire shoulders first strike the aprons 11. As the tire expands further, the spreader unit 24 moves in relation to the mold unit 8. As the tire expands, any unbalance in the forces exerted by the tire against the mold, and particularly against the mold aprons 11, cause the spreader unit 24 to move to restore static equilibrium. Now, the wheels 28 are mounted for free movement in any direction on the floor. Consequently, the motion is in such a way as to center the tire, guided into position by the lateral aprons 11, within the mold. To effect their guiding function, the aprons 11 are separated farther at a reduced diameter, for a substantial diametral distance, especially starting from where the tire bears against these aprons 11 when the tire is completely expanded in the mold. Thus, unless the tire is already centered, as the tire expands, it strikes one or the other guide aprons 11 first, and is guided thereby toward a central position. When fully expanded in the mold 10, the tire bears against both aprons 11 at its sides, as well as having its newly applied rubber bearing against the tread forming part of the mold 10. The tire is centered not only at the center point, that is, with the two centers, that of the tire and that of the mold, at the same point, it is also centered with respect to the central plane of symmetry of the mold normal to the axis The two axes are aligned, and the central plane of symmetry of the tire and of the mold are brought into coincidence. Thus, the tire itself, when in operation on the road, is dynamically balanced. In fact, this dynamic balance appears to be better than that which is achieved by any other method employed today in recapping tires, and at any rate is satisfactory for road service.

The lateral guide plates need only assure lateral alignment of the two axes of the units sufficiently to make entry of the spread tire into the mold reasonably easy. It is desirable that a certain freedom of movement remain. The desirable motion, however, is such as to leave the center points coincident. Therefore, the outwardly facing guide plates 22 have a curvature which is substantially centered on a vertical axis passing through the center of the tire mold. The inwardly facing guide plates may have a slight outward taper at their forward portion to make it easy to bring them around the inner guide plates 22, and then at their rear portions may be parallel with each other, and spaced to remain substantially tangential to the outwardly facing guide plates 22, where they bear against each other during release of the tire into the mold. However, none of the spacing or curvature of the guide plates is at all critical. Wide departures from the supposedly ideal condition seem to have no practical effect on the results achieved. Note that when the tire is first inserted into the mold 10, because of the guide plates, the tire is substantially centered vertically because the heights of the mold 10 and of the spreader unit 24 are such that their axes are substantially the same distance from the floor. For this purpose the mold unit is preferably made so that the height of the tire mold 10 may be adjusted. For example, the mold unit 8 may be set on legs 13 permitting initial vertical adjustment by threads, as shown. These legs may also provide for levelling and may then be permanently locked. In the axial direction, the operator need only bring the tire within the mold sufficiently to assure the tire being engaged by the guide aprons 11 throughout its circumference. After the release of the tire is completed, the tire is grasped and centered within the mold 10. The important things are that the release of the tire be initiated in such a way that as it starts to enter the mold, it is guided into place by the aprons 11, and that sufficient freedom of movement be afforded between the two units so that the tire is free to assume the ideal, centered position into which it is guided by the aprons 11 as the release proceeds. The guide aprons 11 are not necessarily continuous, as shown. For example, twelve or sixteen equally spaced, equal size sectors of the guide aprons may be retained as guide means and the intervening parts of the aprons omitted.

The position of the tire before the complete withdrawal of the spreader unit 24, but after release of the tire from the spreading forces, is made clear from the cross-sectional view of Fig. 4. It is believed that, because of the expansion of the tire on release of the spreading forces, the tire exerts a considerable pressure against the mold 10 in a radial dimension. This belief includes, of course, the assumption that a tire of appropriately chosen dimensions relative to the mold 10 and with a suitable amount of fresh rubber, or camelback applied to it, is inserted in the mold. In most other machines for curing tires, the radial pressure produced by the entry of the tire above-described is absent. With this radial pressure present, however, less additional pressure is required to be exerted radially by a pneumatic pressure bag, which is inserted as an inner tube in the tire and inflated before the curing action begins. When the tire itself exerts no radial pressures, such a table must be heavy enough to cause all of the pressures desired. First, however, this tube must exert pressure to expand the tire into close contact with the mold, before pressure effective for the purpose of effecting a cure may be produced. In other wards, ordinarily the tire itself must be expanded radially from its normal shape before the newly applied rubber comes into contact with the mold.

As a consequence of the pressure radially exerted against the mold 10 in the present machine when the tire is released, a lighter pneumatic bag may be used for producing the requisite additional pressure so that the rubber may be cured, than otherwise. The use of the lighter bag makes handling easier, since the bag itself may be difficult to handle due to its weight and bulk. Also, a pressure plate, which acts somewhat as a rim and against which a pneumatic bag may expand to increase the radial pressure exerted on the tire, and as is used in some machines, is not required. Furthermore, no side jigs, or plates, are required for centering the tire in the mold. The operator does not need to exercise care and take an undue amount of time in adjusting the tire in proper position in the mold. The tire need only be positioned substantially in the correct position, and the aprongs 11 guide the tire into its proper position more accurately than usually can be done by an operator.

In the view of Figure 4, a pneumatic pressure bag 84 is shown in place before inflation. As preferred in the practice of the present invention, the bag shown is substantially flat in transverse cross-section. These flat cross-sectional bags are available commercially. Note also that the mold is substantially flat in transverse cross-section across the face presented in the tire (excluding tread marks or depressions). Experimentation indicates that these shapes are best suited to provide a desirable distribution of rubber across the finished tire in this machine. The reason is thought to be that the radial pressure pre-exerted by the released tire, before the pneumatic bag is inflated, already provides some radial pressure against the mold 10 at the crown, or near the midline around the tire. A pressure bag which is round in transverse cross-sectional shape tends to enhance this pressure at the crown, and reduces the amount of rubber which stands there. Consequently, the tire molded in a machine of the present invention tends to come out of the mold after curing with a dish-shaped, that is, concave inward, instead of the desired substantially flat, or at best, slightly concave outward shape across the tire face as viewed in a cross-section along a plane including the radius. In other words, in practicing the present invention, it appears that the use of a "round" pressure bag results in a tendency to leave too little rubber near or at the center line of the tire.

A single tire spreader unit 24 may be used in cooperation with several mold units 8, as indicated in Fig. 6. Furthermore, the mold units may each accommodate a size of tire different from that of another of the mold units cooperating with the same spreader unit 24. Each mold unit 8 is adjusted so that the axis of the mold 10 of that unit is at substantially the same height from the floor as that of the axis of the spreader unit, and to use a reasonably flat floor. Furthermore, any mold unit 8 may be opened to receive another mold 10. The levered screws 14 are removed, and then the draw bolts 20 may also be loosened. The mold 10 may then be removed and another of the same outside diameter but a different inside diameter inserted. The screws 14 are reinserted and tightened to seat the mold 10 against a suitable stop or stops and the draw bolts 20 tightened. If a new mold of different inside diameter has been inserted, there is no height adjustment necessary. The spreader unit and mold unit remain in center to center alignment, regardless of mold or tire size.

With a machine of the present invention, a tire may be inserted in the machine in so short a time as a minute. The spreader unit 24 may then be withdrawn and wheeled to another mold unit 8. Thus several mold units may be serviced with one spreader unit, providing an important economy in investment over previous arrangements, which lacked the ready facility and comparably convenient use of one major part of a machine with each remaining part of several other machines to provide, effectively, several complete machines in operability.

After a tire has been "locked," or inserted in the mold unit in the manner described in the foregoing, and the pneumatic pressure bag put in place, the air hose couplings 78, 74 may be decoupled, and the spreader unit 26 removed for use with another mold unit 8. An air coupling may be applied to the pneumatic bag, now in place as illustrated in Fig. 4, and the bag inflated to the proper pressure. If desired a separate source of inflating pressure may be used. Heat in the form of dry steam may be passed through the heating conduits. In some cases, electric heating coils instead of steam lines may be used. After a suitable time, the curing operation is complete. The spreader unit 26 is then returned and used to remove the tire from the mold unit 8, in a manner which should be apparent in view of the foregoing description.

Briefly, for removal of a tire, the spreader unit is moved again into position to embrace the mold unit 8. The front claws 40, 42, are engaged in one side of the tire, and the rear claws 54 engaged in the other side of the tire. The front claw assembly 30 is moved to pull the two sides of the tire apart, causing a corresponding decrease in diameter of the tire. The tire may now be removed by moving the entire spreader unit forward. The front assemblies are now moved back to release the spreading forces on the tire. The extensions 36, 38 are extended until released from within the tire annulus, then swung outward to be clear of the tire. Now the rear claws 54 may be brought together, by releasing the pressure on the rear cylinder 68, and allowing the springs 101 to retract, until the rear claws 54 are brought together, and the tire may be then maneuvered off of the rear claws 54. Note, again, the operator need not lift the tire, nor need use a separate lifting hoist. Another tire may now be placed in position around the rear claws 54 ready to be picked up by the rear claws and then to be spread and inserted in the mold 10.

From the foregoing, it is apparent that the invention provides a machine for curing a recap tire which machine is efficient, automatically centers the tire, and provides economy of parts, since several of one part of a machine may cooperate with a single other major part shared among them. Further, the machine reduces the hand labor required over that required in using many prior machines, for example, by reducing the adjustments demanded of an operator, and by reducing the hand labor for handling the machines.

What is claimed is:

1. A retread machine comprising a mold unit adapted to hold a retread mold with its axis horizontal, a tire spreader unit comprising a framework, a group of rear arms each having an individual claw, said rear arms being mounted on said framework and arranged about a horizontal axis, a group of front arms each having an individual claw, said front arms being mounted on said framework on opposite sides of said rear arms axis, said units being movable with respect to each other and including guide means, said arms being mounted on said framework to open so that said spreader unit may be moved with said axes at about the same height and guided into near alignment in a horizontal plane by said guide means, said arms being mounted on said framework to open so that said spreader unit may be moved into said position and said arms thereafter closed to embrace said mold unit and a tire held therewithin, and means for increasing the distance between said front arm claws and said rear arm claws along said axis with said rear arm claws rearwardly of said front arm claws, for spreading said tire when engaged by said claws, said guide means comprising a pair of outwardly facing plates on said mold unit and a pair of inwardly facing plates on said spreader unit positioned to engage said outwardly facing plates when said units are moved together.

2. A retread machine as claimed in claim 1, the plates of one of said pairs being curved.

3. A retread machine as claimed in claim 1, the said outwardly facing plates having their outer surfaces curved cylindrically about a vertical axis which passes substantially through the center of said mold when said units have thus been moved together.

References Cited in the file of this patent

UNITED STATES PATENTS

| | | |
|---|---|---|
| 2,167,981 | Kalbfleisch | Aug. 1, 1939 |
| 2,250,740 | Anderson | July 29, 1941 |
| 2,302,133 | Maze | Nov. 17, 1942 |
| 2,335,878 | Oren | Dec. 7, 1943 |
| 2,444,898 | Butterfield | July 6, 1948 |
| 2,451,097 | Kraft | Oct. 12, 1948 |
| 2,475,579 | Napier | July 5, 1949 |
| 2,477,858 | Brabbin | Aug. 2, 1949 |
| 2,591,934 | Hawkinson | Apr. 8, 1952 |
| 2,665,108 | Branick | Jan. 5, 1954 |

OTHER REFERENCES

"Hawkinson Treads," P. E. Hawkinson Co., Minneapolis, Minn., 1940. (Copy in Div 15.)